United States Patent Office 3,453,116
Patented July 1, 1969

3,453,116
EMULSIFIER SYSTEM
Ernest H. Freund, Evanston, Ill., assignor to National Dairy Products Corporation, New York, N.Y., a corporation of Delaware
No Drawing. Filed June 28, 1965, Ser. No. 474,199
Int. Cl. A21d 2/16
U.S. Cl. 99—90      18 Claims

ABSTRACT OF THE DISCLOSURE

The present invention is directed to an emulsifier system comprising a propyleneglycol monoester having a saturated fatty acid moiety derived from oils and/or fats and a stabilizer for the monoester. The monoester is predominantly in the alpha crystalline form and the stabilizer which is an ionic surface active salt, functions to maintain the alpha crystalline form of the monoester. The emulsifier system is substantially free of solvent for the monoester. The invention is particularly useful as an emulsifier system in food products.

---

The present invention relates generally to emulsifier systems and, more particularly, it relates to substantially fat free emulsifier systems comprising monoesters of propylene glycol and glycerol having long chain saturated fatty acid moieties.

Monoesters, which for purposes of this specification shall comprise both monoesters of propylene glycol and glycerol having long chain saturated fatty acid moieties, are well known in the food industry and have been widely used for baked goods, as parting agents, as complexing agents, and as emulsifiers and stabilizers for ice cream. The monoesters have also been used in the cosmetic industry as non-toxic, metabolizable emulsifiers in cremes and ointments.

The monoesters are polymorphous in the crystalline state and when cooled from a melted state, transition occurs through an unstable, lower melting sub-alpha and alpha crystal forms to the higher melting beta prime and beta crystal forms. The latter forms are stable. Differences in the density of crystals in the sub-alpha crystalline form have been found, depending upon the rate of cooling of the monoesters and, accordingly, several unstable alpha and semivitreous forms may exist. All of these unstable crystal and semivitreous forms are generally referred to in the following as "alpha forms" and the more stable beta prime and stable beta forms are generally referred to in the following as "beta forms." The alpha forms and beta forms can be differentiated by X-ray diffraction and the infra-red spectroscopic techniques. By the latter technique, it has been found by examination of the various crystal forms that the degree of hydrogen bonding within the crystal increases during transition from the alpha forms to the beta forms and that the alpha form possesses some rotational freedom, while the beta form is typical of crystal forms without orientational freedom.

The alpha forms are generally water dispersible at ambient temperatures and possess whip imparting properties and high emulsifying power. The beta forms are generally not water dispersible at ambient temperatures and their aqueous suspensions possess low whip imparting properties. They can be activated by heat treatment and converted into the alpha forms to make them water dispersible and provide whip imparting properties. Since, water dispersibility of emulsifiers in solid state at ambient temperatures and the formation of such aqueous dispersions which possess whip imparting properties is of extreme importance for many applications in the food industry, many attempts have been made to improve the water dispersibility and whipability of the monoesters.

Mixtures of mono and diglycerides have been produced in a "self-emulsifiable" form by admixing soaps which function as co-emulsifiers. Such mixtures even if water dispersible contain the glycerides in a beta form, which possesses low emulsifying power and low whip imparting properties, compared with the monoglycerides in the alpha form. Moreover, the soap imparts a taste to the mixture which excludes its use in many food products. If distilled monoglycerides and co-emulsifiers are used, aqueous dispersions containing the monoglycerides in alpha form can be obtained only at elevated temperatures. However, there is a gradual decay from the alpha forms to the beta forms which may occur in a few hours or in several weeks with accompanying reduction of the whip imparting properties.

Shortenings comprising mixtures of mono and dipropyleneglycol stearate are known. These esters are in the shortening in admixture with fat and emulsifying agents. (See Letters Patent of the United States Nos. 2,508,393 and 2,611,704.) However, these mixtures are to be distinguished from this invention, wherein the emulsifier system is substantially fat free to maintain the crystal structure, as will appear more clearly hereinafter.

Another attempt to stabilize monoglycerides in an unstable crystal form is described in Letters Patent of the United States Nos. 3,034,897 and 3,034,898. The preferred composition disclosed in these Letters Patent is a blend of distilled monostearin and distilled propyleneglycol-monostearate. The blend is rapidly solidified after melting and mixing. It is stated that substantial proportions of the monostearin are in the alpha crystal form for extended periods of time, while the propyleneglycol monostearate of the blend changes from the alpha crystal forms to the beta crystal form shortly after solidification. The mixtures described in the above Letters Patent are commercially sold under the name "Myvatex 3–50." However, it has been found that these mixtures do not have good water dispersibility and whip imparting properties even after relatively short storage periods at 37 degrees C. It appears that for incorporation in foods, like pureed fruits, a preheating of the mixture at temperatures between 60 degrees C. and 121 degrees C. is necessary.

In the previous attempts referred herein it was not possible to prepare a storageable dynamic emulsifier which is water dispersible and which yields aqueous dispersions, possessing high whip imparting properties, since these emulsifiers are subject to relatively rapid transition. The speed of transition in solid state is generally accelerated with increasing temperatures and while it might be possible to retard the transition from the active to the inactive state by storing at low temperatures, such methods are generally not feasible or desirable in the food industry. In the storage of dry mixes for baked goods which contain solid food emulsifiers, storage temperatures of around 38 degrees C. are often met for prolonged times. In the preparation of baked goods, the heat activation of solid emulsifiers, in order to make them water dispersible, is often cumbersome and practically not feasible.

It would be desired to provide a stable emulsifier system which is readily dispersible in water, and which, after prolonged storage at temperatures around 38 degrees C., yields aqueous dispersions having high whipping properties and high emulsification power. In addition, the emulsifier system should be useful in the preparation of baked goods, like cakes and bread, and permit use of lower fat contents and even permit such goods to be made without any fat addition. Moreover, the emulsifier systems are desirably added to dry mixes, such as dry cake mixes and dry toppings. Such emulsifier systems are desirably useful in ice cream and frozen desserts and generally useful for foods which possess foam character or are subjected to whipping during their processing stages.

A main object of the present invention is the provision of an improved emulsifier system.

An additional object of the invention is the provision of an improved emulsifier system having high emulsifying properties and high whip imparting properties.

It is a further object of this invention to provide an emulsifier system which is readily water dispersible, particularly at ambient temperatures, and which is storageable at higher than ambient temperatures over relatively long periods.

A still further object of this invention is to provide an emulsifier system comprising a fat derivative stabilized in an alpha form and which can be stabilized in such form for an extended period of time.

An additional object of the invention is to provide a dry emulsifier system which can be used in food products and which can be used in cosmetic products.

An additional object of the invention is to provide a dry emulsifier system which can be used in dry mixes in the presence or absence of fats.

A still further object of this invention is to provide an emulsifier system which is useful in baking, ice cream, dessert products, and toppings.

A further object of the invention is to provide an emulsifier system useful in cosmetic products which is harmless and metabolizable.

Other objects and advantages of this invention will become apparent by reference to the following disclosure and description of the invention.

The emulsifier system of this invention principally comprises nonionic propyleneglycol monoester stabilized in alpha form by addition of certain ionic surface active agents, the system being substantially free from triglyceride and diglyceride fats. This system may or may not contain glycerol monoesters having higher saturated fatty acid moieties. The glycerol monoesters can be stabilized in an alpha form by the presence of the other two components. However, while the propyleneglycol monoester can be stabilized by a certain amount of certain surface active agents, glycerol monoesters in the absence of propyleneglycol monoesters cannot be stabilized with the same amount of such surface active agents. It has been found that a combination of propyleneglycol monoester and glycerol monoester, without the presence of stabilizing surface active agent, does not possess stability in the alpha form as shown by infra-red and X-ray examination after a short period of storage.

Although the present invention is referred to as an emulsifier system, its valuable properties are not limited to emulsifying action. It acts as an aerating agent in the preparation of foams, as a conditioning agent increasing the softness and decreasing the rate of staling in bread and baked goods. It also acts as a complexing agent for starch, as a stabilizing agent for ice cream and can be used with advantage in those applications in which freshly activated monostearin is being used.

The emulsifier system of this invention comprising the nonionic propyleneglycol monoesters and the ionic surface active agents, in the presence or absence of glycerol monoesters or their derivatives, represents a new and unique system in which the components appear to interact with each other in a physical-chemical manner, forming interfacial complexes of the type described by J. H. Schulman, et al. (summarized in Clayton and Sumner, 255 ff, 311 ff). The new emulsifier system can be characterized by X-ray diffraction patterns and infra-red adsorption spectra, which show distinctly that the propylene-glycol monoester component, after storage at elevated temperatures is present in an alpha form. The products described in Letters Patents Nos. 3,034,898 and 3,034,897 show after the same storage that the propyleneglycol monostearate component is present in a beta form. There are also distinct differences in the hydrogen bonding between the stabilized and unstabilized systems, which can be demonstrated also by infra-red spectral analysis.

The propyleneglycol monoester should be 1,2 propyleneglycol monoester and if it is in admixture with other materials, the mixture should have high monoester content. The monoester is advantageously purified after usual preparation by molecular distillation. Stearic acid is the preferred fatty acid moiety of the ester, but other fatty acid moieties deriving from oils and fats, which after hydrogenation possess a high content of stearic acid are also useful. Unsaturated fatty acid moieties are not suitable for the new emulsifier systems. Examples of fats and oils from which the propyleneglycol monoester can be derived are soyabean oil, cottonseed oil, lard, and tallow. Hydrogenation of the fatty acid moieties can be performed before or after formation of the propyleneglycol monoester. Their principal fatty constituent after hydrogenation is stearic acid. Thus, the main component of the new emulsifier system is 1,2 propyleneglycol monostearate, which will be abbreviated in the following as PGMS.

The aforementioned ionic surface active agents are referred to herein as stabilizers because of their function in maintaining or stabilizing the alpha forms. These agents or stabilizers are either anionic or cationic salts which are dispersible in the monoesters. The alkali salts of the stabilizers should be water dispersible and in dispersion they should possess colloidal properties and appreciably lower the interfacial surface tension between oil and water.

To facilitate the formation of interfacial complexes with the monoesters, it is advantageous that the stabilizers contain a plurality of groups, which act as acceptors for hydrogen bonds or are hydrogen bonding in character. Thus, stabilizers containing ester acids as anion, are more effective than those containing straight carboxylic acids. It has been found that the stronger the acid donating the anion of an anionic stabilizer or the stronger the base donating the cation of the cationic stabilizers, the higher is the stabilizing action of the surface active agent.

The hydrophylic-lypophylic balance (HLB) is an indication of the type of stabilizer desired. It has been found that the alkali salts of the stabilizers should have an HLB of above 16, but preferred are such stabilizers which have an HLB value above 20.

The concentration of the stabilizer in the emulsifier system of the invention is in the range between a lower limit which is necessary to establish an interfacial complex and in most cases above 1 percent of the weight of the propyleneglycol monoester. The upper limit is determined by the reappearance of the characteristic long spacings of the stabilizer in the X-ray diffraction pattern of the interfacial complex, and is in many cases above 10 percent, but below about 25 percent based on the weight of the emulsifier. When the characteristic long spacings of the stabilizer reappear, the stabilizing effect is substantially reduced. This may be explained in an hypothetical way, which explanation, however, should not in any case limit the extent and scope of the invention. It is believed that hydrogen bonding is one of the principal forces, causing transition from the active alpha forms of the propyleneglycol monoester into the beta forms. It has been confirmed by infra-red spectral analysis that the alpha forms contain a lower degree of hydrogen bonding than the beta forms. Since the electrically charged stabilizers are a component of the interfacial complexes, the latter possess equal electrical charge and are repelling each other, thereby preventing hydrogen bonding and transition to a beta form. If, however, the stabilizers are present in such a high concentration that a crystalline phase outside of the interfacial complexes is formed, the activity of the interfacial complex is destroyed. The reappearance of the crystalline phase of the stabilizer can be detected by infrared spectral analysis and X-ray diffraction techniques.

For emulsifier systems used in the food industry, it is of importance that the stabilizer components have a bland or agreeable taste (which substantially excludes soaps derived from higher fatty acids) and that they are nontoxic. Of course, the components should be easily metabolized to such moieties as are contained in usual human foods.

We have found that the non-toxic alkali and alkaline earth salts of certain acids have the desired properties and effectively function as stabilizers. These are the salts of mono-, di-, or tri-carboxylic acids, which contain adjacent to the carboxylic group, one carbon atom, or an aliphatic chain of not more than five carbon atoms, one of which is connected by one or more ester or amide linkages with an acyl group derived from a fatty acid, having an even carbon chain of 12-22 carbon atoms. Of the compounds which possess such a chemical structure are those especially suitable which have an HLB value above 20. Such compounds may derive from monomeric or polymeric aliphatic hydroxy acids, like hydroxy acetic acid or lactic acid for example, potassium stearyl lactate is mentioned as representing this type. Another type may consist of the sodium salt of an acidic half ester of a glycerolmonoester of a higher fatty acid and a dibasic acid such as succinic acid, adipic acid, maleic acid, fumaric acid, tartaric acid, or diacetyltartaric acid. The sodium salt of monostearin succinic acid half ester is representative of this type. Another type may consist of acylated amino acids, like stearyl-N-glycine sodium salt, and palmityl-N-alaninepotassium salt. Also, the alkali salts of protein digests which have been acylated with higher fatty acids having a straight chain of 12-22 even carbon atoms are useful stabilizers.

Stabilizers which are also useful for food products and derive from higher fatty alcohols are, for example, the sodium salt of the half ester of fumaric acid and stearyl alcohol, and the sodium salt of sulfated lauryl alcohol.

Many of the anionic salts mentioned before, have, in aqueous dispersion, an alkaline pH because they are hydrolytically dissociated. If it is desired to use salts which have, in aqueous dispersion, a neutral pH, this can be achieved by adding acidic reagents, preferably those acids which are a component of the salt.

Although cationic substances are very effective as stabilizers in the new emulsifier system, only a limited number can be used as food emulsifiers since many are toxic. A very effective cationic stabilizer of low toxicity is the hydrochloride of the stearyl alcohol ester of glycine, which can be prepared according to Letters Patent No. 2,785,152.

Soaps, like potassium stearate, are not very effective in stabilizing the new emulsifier systems since their anion is a very weak acid possessing no plurality of hydrogen bonds, their activity in lowering the interfacial tension between oil and water is not great and the HLB value is below 20. They would have to be used in such large concentrations that their use in food products would be excluded.

It has been found that the stabilizers preferably are monovalent salts, but polyvalent salts can be used, as for example calcium salts. The polyvalent salts, as before indicated, often lack water dispersibility, but are often useful.

If the emulsifier system is used in cosmetic, or industrial products, other very effective stabilizers can be used, such as the esters of sulfosuccinic acid sodium salt, the N-octodecyl sulfosuccinamate, the salts of quaternary bases, e.g., the trimethyldodecyl ammonium chloride, the octodecyl trimethyl ammonium bromide, the trimethyl benzyl ammonium chloride.

In addition to the propylene glycol monoester and the stabilizers, other fatty acid esters of polyhydric alcohols may be present in the emulsifier system of the invention and may be components of the interfacial complexes. The presence of those compounds which will enter the complex are desirable but the presence of compounds which will not form a part of the interfacial complex are not desirable and tend to impede the activity of the new emulsifier systems.

The fatty ester of polyhydric alcohols, which may take part in the formation of the interfacial complexes, can increase the melting range of the system and are sometimes available at lower market prices, thus reducing the cost of the system. Such compounds are monoglycerides and lactylated monoglycerides which are high in fatty acid content. The monoglycerides are desirably in high purity and are advantageously purified by molecular distillation. Stearic acid is the preferred acid component of the ester. However, other acid moieties which are high in stearic acid content and are the same as used in the preparation of the propylene glycol monoesters are also useful. The esters should not contain unsaturated, higher fatty acid groups. The lactylated monoglycerides which are capable of taking part in the formation of the mixed complexes of the main components are useful. The lactylated monoglycerides should also contain a saturated higher fatty acid component such as stearic acid and should not contain unsaturated fatty acids. The lactylation can be done in many ways. Useful products are obtained by using the techniques described in Letters Patent Nos. 3,051,734, 3,029,147, 3,012,048, 3,011,896, 2,690,971 and 2,509,414.

The amount of monoglycerides and/or lactylated monoglycerides which can be added to the emulsifier system, and which is able to participate as a component in the formation of an interfacial complex, is limited. In most cases, a ratio not higher than about 55 parts glycerol ester to 45 parts propylene glycol ester is possible. If these monoglycerides are added to the emulsifier system, the lower limit of stabilizer present to stabilize the system has to be increased and the upper limit of the stabilizer present has to be decreased. In other words, the amount of stabilizer used becomes more critical.

It is important that the emulsifier system of the invention be substantially free from solvents for the propyleneglycol monostearate or other monoester. Thus, the system will not comprise any significant amount of tri- or diglyceride fats or oils. It has been found that the solvents, including fats and oils, whether saturated or unsaturated, tend to reduce emulsifying and whip imparting properties, and impair the crystal stability, when fats and oils are intimately mixed with the emulsifier system. In such mixture, they interfere with the interfacial complex.

However, in the course of their application, the emulsifier systems can be mixed with fats and oils without losing their usefulness. This is possible because in most cases, especially in the preparation of batters for baked goods, the time of transition of the emulsifier system from the functional to the non-functional state is much longer than the time the emulsifier system is allowed to exert its function during its application. Thus, the emulsifier system must be substantially fat free to maintain stability, but is useful in fat systems if its effect can be utilized in a time less than the time in which its stability is lost.

The principal two components and the other compatible components can be blended together either by melting or by dispersing in aqueous media. When they are prepared by melting, the PGMS and other compatible monoesters are melted first and the stabilizers are advantageously added to the melted components. The melted mixture is stirred until the stabilizers have been dissolved or the mixture becomes homogeneous. Overheating should be avoided. The mixture is then fast cooled either by spray-chilling, votating or pouring on cold rolls, and the resulting solid product is comminuted if necessary to a fine mesh size.

When the principal components are blended in an aqueous dispersion, the components are dispersed in water at temperatures at the melting point or above of the monoesters and the mixture is advantageously homogenized in a blender or other suitable equipment. This dispersed emulsifier system has a high functionality and can be stored for extended periods at elevated temperatures, e.g., 37 degrees C. The aqueous dispersions can be dried. Suitable drying methods are spray drying, freeze drying, foam drying, and mat drying. To facilitate drying, especially spray drying, it is advantageous to add water soluble materials, which do not possess solvent power for the partial esters. Such additives can be chosen according to the end uses. For food uses, skim milk, soluble caseinate, starch, carboxymethylcellulose sodium salt, sucrose are suitable.

The functionality of the emulsifier system can be determined by its whippability. A simple test was developed which yields reproducible values and correlates well with baking performance. In performing this test, four grams of the emulsifier system are dispersed at 20 degrees C. in 200 ml. tap water and the dispersion is whipped in a five quart bowl on a Hobart N–50 mixer until the foam reaches its biggest volume. The weight per unit volume of the foam and whipping time are noted. Emulsifier systems of this invention yield overruns up to 2000 percent within four minutes.

As mentioned before, functionality can also be determined by physical measurements such as X-ray diffraction and infra-red spectral analysis. Distinct differences between unstabilized, properly stabilized, understabilized and overstabilized emulsifier systems can be detected by these techniques.

In the X-ray diffraction analyses one distinguishes between short and long spacings. For a polymorphic single component, in general, the short spacings are characteristic of its various crystalline states while the long spacings are in general characteristic for individual materials, thus allowing for instance, the monoesters to be distinguished from the stabilizer.

For the multicomponent systems described in the instant invention, the short spacings are again characteristic for the morphological state of the interfacial complexes and the appearance of the long spacings are indicative of their formation. The long spacings in the interfacial complexes are longer than any of the long spacings of the individual components. The long spacings also permit the detection of excess stabilizer which is not a part of the interfacial complex. When properly prepared, the short spacings of an interfacial complex exhibit an alpha form. In a nonstabilized system the long spacings of the components are not changed and the short spacings exhibit either beta prime or beta character. Freshly prepared interfacial complex is for a short time after its preparation still in a dynamic state in which the short spacing characteristics change from the sub-alpha to the alpha. This change is also accompanied by a stretching of the long spacings. Thus, reproducible measurements are best obtained after the system becomes static, which, in most cases, will occur after aging at 37 degrees C. within eight days.

As mentioned above, the infra-red spectral analysis can be used as a complementary tool in the identification of crystal structure. In addition, it permits an approximation of the degree of hydrogen bonding, which is indicated in the range of 2.8 to 3.1 microns wave length. It was earlier stated that the monoesters in the alpha forms show the smallest degree of hydrogen bonding and the beta forms the highest. This degree of hydrogen bonding is one of the criteria of functionality.

In Table I are tabulated the results of X-ray diffraction, infra-red spectral analysis and the functionality of test samples tested immediately after the preparation and after storage at 37 degrees C. within eight days. The test samples consist of distilled propyleneglycol monostearate (PGMS), and various amounts of a stabilizer, stearyl-2-lactic acid potassium salt (SLAK).

The results of similar compositions, which contain as an additional substance distilled monostearin (MS) are shown in Table II. The results obtained from the single components are also tabulated and the functionality determined by the whipping tests included in the tables.

The results of these test samples of Table I, which contain only 0.1–1 percent SLAK stabilizer, show that these test samples are understabilized (Tests 1 and 2) since the short spacings exhibit beta characteristics and the degree of hydrogen bonding is medium or strong. The tests containing 3 percent to 15 percent stabilizer are properly stabilized, since the short spacings exhibit alpha characteristics before and after aging and the characteristic long spacings of the formed interfacial complex has appeared. The degree of hydrogen bonding in these tests is low and the functionality good (Tests 3, 4, 5, and 6). The test sample containing 30 percent stabilizer is overstabilized, since the long spacing characteristic of the stearyl-2-lactic potassium salt (SLAK) appears in the long spacing data. The crystal structures obtained by X-ray diffraction analysis correlates well with the results obtained by infra-red analysis, and both correlate well with the whipping tests.

As can be seen from the results of Table II, a mixture of equal parts PGMS and MS which has not been stabilized (Test Sample 9) will, on aging, undergo a fast transition from an alpha to a beta form, lose its functionality and increase in hydrogen bonding. The same mixture containing 7 percent SLAK stabilizer retains its alpha structure during aging, exhibits good functionality and shows no increase in hydrogen bonding (Test Sample 10), stabilized monostearin (Test Sample 8) and unstabilized monostearin (Test Sample 11) quickly undergo transition into the beta form, show only poor or no functionality and exhibit strong hydrogen bonding.

TABLE I.—EMULSIFIER SYSTEM CONSISTING OF PGMS AND VARIOUS AMOUNTS OF POTASSIUM SALT OF STEARYL-LACTIC ACID AS A STABILIZER

| | Stabilizer, percent | Storage at 37° C., days | X-ray Diffraction Analysis | | Whip Test Performance | | Infra-red Spectral Analysis Hydrogen Bonding [3] |
|---|---|---|---|---|---|---|---|
| | | | Short Spacings Definition | Long Spacing in Å [1] | Days | Overrun [2] | |
| Test No.: | | | | | | | |
| 1 | 0.1 | 0 | Beta prime | 49.9 S | 0 | 0% | Medium. |
| 1a | 0.1 | 4 | do | 49.9 S | 7 | 0% | Do. |
| 2 | 1 | 0 | do | 49.9 S | 0 | 1,100% | Weak. |
| 2a | 1 | 4 | do | 50.2 VS | 7 | 450% | Medium. |
| 3 | 3 | 0 | Sub alpha | 49.0 S | 0 | 2,000% | Weak. |
| 3a | 3 | 4 | do | 52.6 S | 9 | 2,000% | Do. |
| 4 | 5 | 0 | do | 53.5 M | 0 | 1,900% | Do. |
| 4a | 5 | 4 | Alpha | 53.5 S | 20 | 1,900% | Do. |
| 5 | 7 | 0 | Sub alpha | 48.4 S | 0 | 1,800% | Do. |
| 5a | 7 | 4 | Alpha | 54.8 VS | 15 | 1,600% | Do. |
| 6 | 15 | 0 | Sub alpha | 55.9 VS | 0 | 1,600% | Do. |
| 6a | 15 | 4 | do | 54.8 VS | 9 | 1,500% | Do. |
| 7 | 30 | 0 | do | 60.0 S, 34.0 M | 0 | 0% | Do. |
| 7a | 30 | 4 | Alpha | 56.6 VS, 35.6 M | 9 | 0% | Do. |
| Characteristic of components: | | | | | | | |
| PGMS | | | Beta prime | 50.0 S | 0 | | |
| K-salt of stearyl lactic acid | | | Beta prime, beta | 35.0 S | 0 | | |

[1] M=moderate intensity.
S=Strong intensity.
VS=Very strong intensity.

[2] $\text{Overrun} = \left(\frac{\text{Weight per volume of water}}{\text{Weight per volume of foam}} - 1\right) 100$

| Overrun | Grade |
|---|---|
| Above 1,000% | Good. |
| 1,000 to 625% | Fair. |
| 625 to 375% | Poor. |
| 375 to 0 | No activity or no whip. |

[3] Hydrogen bonding (degree), position of OH stretching frequency in the IR spectra:
2.8 to 2.975 micron, weak.
2.98 to 3.0 micron, medium.
3.0 to 3.2 micron, strong.

TABLE II.—EMULSIFIER SYSTEM CONSISTING OF PGMS AND VARIOUS AMOUNTS OF STEARYL-2-LACTIC ACID POTASSIUM SALT (SLAK) AND CONTAINING DISTILLED MONOGLYCERIDES ABBREVIATED MS AS ADDITIVES

| Composition | Storage at 37° C., days | X-ray diffraction Analysis | | Whip Test Performance | | Infra-red Spectral Analysis Hydrogen Bonding [3] |
|---|---|---|---|---|---|---|
| | | Short Spacing Definition | Long Spacing in Å [1] | Days | Overrun [2] | |
| Test No.: | | | | | | |
| 8 — 93% MS, 7% SLAK | 0 | Beta prime / Beta | 54.2 M / 50.5 S | 0 | 100% | Strong. |
| 8a — do | 4 | Beta prime / Beta | 51.3 S | 4 | 0% | Do. |
| 9 — 50% PGMS, 50% MS | 0 | Alpha | 53.9 S | 0 | 650% | Do. |
| 9a — do | 4 | Alpha / Beta | 52.9 S | 8 | 0% | Do. |
| 10 — 46.5% PGMS, 46.5% MS, 7% SLAK | 0 | Alpha | 54.5 VS | 0 | 2,100% | Weak. |
| 10a — do | 4 | do | 54.5 VS | 20 | 2,000% | Do. |
| 11 — 100% MS | 0 | Beta / Beta-prime | 54.5 S / 50.8 S | 0 | 0% | Strong. |
| 11a — do | 4 | Beta, beta prime | 51.8 S | 8 | 0% | Do. |

Legend.—See Table I.

EXAMPLE 1

Emulsifier systems were prepared from mixtures of 1,2 propyleneglycol monostearate and various stabilizer salts.

(a) 93 grams 1,2 propyleneglycol monostearate and 7 grams potassium salt of N-stearyl glycine.

(b) 92 grams propyleneglycol monostearate and 8 grams of sodium salt of the succinic acid half ester of monostearin.

(c) 93 grams 1,2 propyleneglycol monostearate and 7 grams of potassium salt of stearyl-2-lactic acid.

(d) 93 grams 1,2 propyleneglycol monostearate and 7 grams of the potassium salt of stearyl hydroxyacetic acid.

The mixtures (a)–(d) were each heated with stirring at 55 degrees C. until the mixtures became homogeneous, taking an average time of about 12 minutes. Then they were transferred to a spray gun of the type used for spraying paint, which used compressed air and a heating unit to hold the mixture at about 55 degrees C., while spraying. The mixture was then sprayed into a cold air stream. The fine powders which resulted from these operations were designated as emulsifier systems a, b, c, and d and used in tests described hereinafter.

Emulsifier systems which contain 1,2 propyleneglycol monostearate, various stabilizer salts and distilled monostearin as additive were prepared from the following mixtures:

(e) 46.5 grams propyleneglycol monostearate, 46.5 grams monostearin and 7 grams N-stearyl glycine.

(f) 46.5 grams propyleneglycol monostearate, 46.5 grams distilled monostearin and 8 grams of sodium salt of the succinic acid half ester of monostearin.

(g) 46.5 grams propyleneglycol monostearate, 46.5 grams monostearin and 7 grams of the potassium salt of stearyl-2-lactic acid.

(h) 48.75 grams propyleneglycol monostearate, 48.75 grams monostearin and 2.5 grams of the HCl salt of stearyl alcohol glycine ester.

(i) 49.1 grams propylene glycol monostearate, 49.1 grams monostearin and 1.8 grams sodium lauryl sulfate.

The mixtures (e)–(i) were each heated with stirring to 78 degrees C. until the mixtures became homogeneous and were then transferred to the spray gun, in which the material was held at a temperature of about 70 degrees C. The material was then sprayed into a cold air stream. The fine powders were designated as emulsifier systems e, f, g, h and i used in tests also described hereinafter.

The functionality of the emulsifier systems (a)–(i) was measured by the previously described whipping test, after storage for at least 14 days at 37 degrees C. and the following results were obtained:

|  | Whipping Time in Minutes | Overrun in Percent |
|---|---|---|
| Emulsifier System: | | |
| a | 3 | 1,900 |
| b | 4 | 1,600 |
| c | 3 | 1,900 |
| d | 3 | 1,950 |
| e | 4 | 1,900 |
| f | 5 | 1,580 |
| g | 4 | 1,600 |
| h | 3 | 1,900 |
| i | 3 | 1,700 |

Comparative tests were made between some of the above emulsifier systems and commercial emulsifiers for fruit foams. These are described in Table III.

TABLE III
FRUIT FOAMS MADE WITH THE NEW EMULSIFIER SYSTEMS AND COMMERCIALLY AVAILABLE EMULSIFIERS 4 grams of emulsifier were dispersed in 40 ml. of water at the temperature tabulated below and added to 200 grams of applesauce with 25 percent solid content at 21 degrees C. The mixture was whipped in a Hobart mixer N–50 using the 5 quart bowl until maximum foam height was reached.

| Emulsifier | Composition | Dispersion Temp., °C. | Emulsifier Storage Temp., °C. | Emulsifier Storage Time, days | Whip Time, min. | Overrun, percent |
|---|---|---|---|---|---|---|
| Myverol 1800 | Monostearin | 21 | (1) | (1) | 10 | (2) |
| Myverol 1800 | do | 71 | (3) | (3) | 8 | 400 |
| Myvatex 350 | Mixture of monostearin and propylene-glycolmonostearate. | 21 | (1) | (1) | 10 | (2) |
| Myvatex 350 | do | 71 | (3) | (3) | 7 | 450 |
| Emulsifier System a | See preceding table | 21 | 37 | 7 | 5 | 1,450 |
| Emulsifier System b | do | 21 | 37 | 7 | 5 | 1,400 |
| Emulsifier System c | do | 21 | 42 | 7 | 5 | 1,450 |

[1] Unknown.
[2] None.
[3] Used at once.

In order to test the influence of the stabilizer concentration on 1,2 propyleneglycol monostearate in the presence and absence of monostearin, tests were made described in Table IV. The functionality was determined by the whipping test. All test samples were aged at least 14 days at 37 degrees C. before whipping.

TABLE IV

| Test Number: | 1,2 propyleneglycol monostearate, grams | Monostearin, grams | Stearyl-2-lactic acid potassium salt, grams | Whipping Test Overrun Percent |
|---|---|---|---|---|
| 1 | 100 | | | No whip |
| 2 | 97 | | 3 | 2,100 |
| 3 | 94 | | 6 | 1,800 |
| 4 | 85 | | 15 | 1,600 |
| 5 | 70 | | 30 | No whip |
| 6 | 90 | 10 | | 1,700 |
| 7 | 80 | 20 | | 1,700 |
| 8 | 65 | 35 | | 1,800 |
| 8a | 55 | 45 | 2 | 850 |
| 9 | 55 | 45 | 3 | 1,500 |
| 10 | 45 | 55 | 3 | 900 |
| 11 | 35 | 65 | 3 | 700 |
| 12 | 27 | 73 | 3 | No whip |
| 13 | 15 | 85 | 3 | No whip |
| 14 | 55 | 45 | 6 | 2,100 |
| 15 | 45 | 55 | 6 | 1,900 |
| 16 | 35 | 65 | 6 | No whip |
| 17 | 27 | 73 | 6 | No whip |
| 18 | 15 | 85 | 6 | No whip |
| 19 | 55 | 45 | 10 | 2,000 |
| 20 | 45 | 55 | 10 | 2,000 |
| 21 | 35 | 65 | 10 | No whip |
| 22 | 27 | 73 | 10 | No whip |
| 23 | 15 | 85 | 10 | No whip |
| 24 | 55 | 45 | 15 | No whip |
| 25 | 45 | 55 | 15 | No whip |
| 26 | 35 | 65 | 15 | No whip |
| 27 | 27 | 73 | 15 | No whip |
| 28 | 15 | 85 | 15 | No whip |

From these tests it can be seen that 1,2 propyleneglycol monostearate, without stabilizers, does not show functionality in whipping test—Test 1. If the emulsifier system contains 30 percent stabilizer—Test 5—it is "overstabilized" and does not show functionality. A concentration of 15 percent stabilizer—Test 4—does not show optimum results, but still shows functionality.

In the presence of monostearin as an additive, the effective emulsifier range is narrowed. "Overstabilization" is already reached at a stabilizer concentration of 15 percent—Test 24. While in the absence of monostearin, 3 percent emulsifier yields high overrun—Test 2; in the presence of monostearin, 3 percent emulsifier yield significant lower overruns—Tests 9–13. The amount of monostearin, which can be present in the emulsifier system is limited and somewhat dependent upon the stabilizer concentration. A mixture of 45 grams propyleneglycol monostearate, 55 grams monostearin and 6 grams stabilizer showed—Test 15—high activity while in the presence of 3 grams stabilizer the same mixture—Test 10 has fair activity. However, 3 grams stabilizer is sufficient to form a highly functional emulsifier system with propyleneglycol monostearate in the absence of monostearin. Although monostearin has a somewhat diluting effect on the emulsifier system, its presence is sometimes advantages, where higher melting points are desirable and its price is of advantage. Higher concentrations of monostearin than 55 percent decrease the functionality of the emulsifier system.

EXAMPLE 2

Spray drying of the emulsifier system

The emulsifier system can be prepared by spray drying of an aqueous suspension of the ingredients in the presence of an enveloping agent. For the preparation of emulsifier systems used in food products we have found skim milk a very suitable enveloping agent; however, other substances or mixtures, e.g., sugar and sodium caseinate, can also be used. Starch addition yields emulsifier systems of high functionality; however, the viscosity of the aqueous suspension before spray drying is very high, because a complex between the emulsifier system and the starch is formed.

In a 5 foot Bowen spray dryer adapted with a 77 x 220 TC nozzle an aqueous suspension of the emulsifier systems was spray dried with a nozzle pressure of 102 atm. The inlet air temperature was 149 degrees C., the outlet air temperature was 82 degrees C. The suspension was prepared by intensive mixing of 16 liter of water, 2 kilogram of propyleneglycol monostearate, 140 grams of potassium salt of stearyl lactic acid and 2.1 kilogram of spray dried skim milk. The mixture was heated at 82 degrees C. during the mixing until the dispersion became homogeneous. The solid content was adjusted to 10 percent by adding water and the mixture was cooled to 32 degrees C. and spray dried. The spray dried product had a very good functionality in whipping and baking tests. When milk powder was used below the 40 percent level, the dried product was coarse, not free flowing, and the functionality of the emulsifier system was lowered

EXAMPLE 3

Use of the emulsifier systems in bread baking

Bread was prepared in a conventional manner using a sponge and dough in which a sponge was first prepared and added to a dough mix. The softness of the bread was determined 24 hours and 72 hours after baking, by the method of the American Association of Cereal Chemists entitled "Staleness of Bread—Compression of Firmness Test with Bloom Gel Meter." (Cereal Laboratory Methods, 1959 6th edition, section 85 lb. p. 352. Published by American Association of Cereal Chemists, University Farm, St. Paul, Minn.). Lower values indicate softer bread. The results of the baking test with various compounds of this invention are set forth in the following table.

TABLE V.—BREAD BAKING TESTS WITH EMULSIFIERS SYSTEMS

| Test No. | Emulsifier System of Example #1 | Emulsifier System Percent of Flour | Lard, Percent of Flour | Specific Volume of Baked Bread, ml./g. | Softness, after 24 hrs. | Softness, after 72 hrs. | Grain |
|---|---|---|---|---|---|---|---|
| 1 | | 0 | 0 | 5.58 | 162 | 240 | Poor. |
| 2 | | 0 | 3 | 5.74 | 155 | 214 | Good. |
| 3 | g | 0.5 | 0 | 5.70 | 122 | 160 | Do. |
| 4 | g | 0.5 | 0.8 | 5.68 | 124 | 169 | Do. |
| 5 | g | 0.5 | 3 | 5.70 | 120 | 169 | Do. |
| 6 | e | 0.5 | 3 | 5.66 | 118 | 158 | Do. |
| 7 | f | 0.5 | 3 | 5.72 | 122 | 164 | Do. |

EXAMPLE 4

Use of new emulsifier systems in cake mixes and cake baking

Commonly used cake mixes usually contain flour, sugar and emulsified fats as ingredients. By means of the new emulsifier systems, however, novel cake mixes can be prepared which do not require the presence of the emulsified fats in the cake mixes.

When cakes are prepared from these cake mixes, only water needs to be added, since such mixtures yield cakes with excellent structural properties without the addition of shortening. However, if it is desired to add shortening, amounts up to 20 percent and more may be added, preferably in the form of oils and any cooking or salad oil may be used for this purpose. In case of shortening addition, the water addition is corrected in the manner described in the following.

Cake mixes prepared with emulsifier systems of this invention have many advantages. Some of them are:

(1) They may contain higher sugar to flour ratios than those in commercially available cake mixes.

(2) Cakes may be baked with no shortening at all.

(3) When the use of shortenings is desired, cakes may be baked containing a substantially higher shortening to flour ratio than those in the commercial ones.

(4) While the shortening used in the commercial cake mixes contains in the average about 18 percent to 20 percent emulsifier of the fat to allow dispersion of the shortening in the batter, the present cake mixes contain only 6 percent to 7 percent emulsifier calculated on the basis of a 20 percent oil level.

(5) In the commercially available cake mixes, hydrogenated or semi-solid shortenings have to be used, in order to prevent bleeding of the cake mix powder, while with the emulsifier system of this invention, liquid oil can be used, which is considered a nutritional advantage.

(6) The large surface area of the shortenings used in the commercially available cake mixes requires the presence of quantities of antioxidants to prevent oxidation. Such oxidation problem does not exist in cake mixes which do not contain fat.

(7) The cake mixes are storable at elevated temperatures, while the storage of commercially available cake mixes at such temperatures results in their deterioration.

TABLE VI.—COMPOSITION OF CAKE MIXES

| Ingredients | White Cake | Yellow Cake | Chocolate Cake |
|---|---|---|---|
| Sugar, granulated | 47.70 | 46.35 | 44.60 |
| Flour | 39.80 | 38.55 | 35.40 |
| Cocoa | | 5.5 | 5.56 |
| Dried Whole Egg | | 4.80 | 4.75 |
| Dried Nonfat Milk (low heat) | 2.50 | 2.90 | 3.90 |
| Edible Wheat Starch | 2.10 | 1.98 | 1.87 |
| Dried Egg White | 1.55 | | |
| Dextrose | 1.50 | | |
| Salt | 0.72 | 1.20 | 1.10 |
| Skim Milk Containing 60% Lecithin | 1.00 | 0.96 | |
| Sodium Bicarbonate | 0.67 | 0.70 | 0.95 |
| Sodium-Aluminum-Phosphate | 0.70 | 0.78 | 0.38 |
| Monocalcium Phosphate | | | 0.06 |
| Emulsifier System [1] | 1.40 | 1.42 | 1.25 |
| Vanilla | 0.36 | 0.36 | 0.18 |
| | 100.00 | 100.00 | 100.00 |

[1] System "g" of Example 1.

TABLE VII.— CAKE BAKING WITH VARIOUS EMULSIFIER CONCENTRATIONS

| Type of Cake | Percent of Emulsifier System "g"[1] in Mix | Batter Specific Weight | Cake Volume, cc. | Comments |
|---|---|---|---|---|
| White | .924 | .88 | 1,080 | Slight open grain. |
| Do | .905 | .80 | 1,115 | Do. |
| Do | 1.086 | .78 | 1,190 | Fair grain. |
| Do | 1.267 | .75 | 1,220 | Good grain. |
| Do | 1.448 | .68 | 1,240 | Do. |
| Do | 1.810 | .58 | 1,050 | Dipped center. |
| Chocolate | 1.448 | .55 | 1,250 | Slightly dipped center. |
| Do | 1.250 | .67 | 1,480 | Good grain for chocolate cake. |

[1] See Example 1.

Formulas for white, yellow and chocolate cake mixes are given in Table VI. Any of the emulsifier systems of the invention, which are suitable for food uses may be employed. Especially suitable are those of Examples 1 and 2. If the spray dried emulsifier system of Example 2 is employed, the emulsifier concentration has to be increased in order to compensate for the dried skim milk present in this system and the amount of dried skim milk given under ingredients has to be accordingly reduced.

In baking cakes for these mixes, a two-step water addition is the preferred procedure.

550 grams of cake mix are put into a mixing bowl of a Hobart mixer and the oil or shortening, if such is used, is added and the amount of water of the first step. This mixture is mixed at low speed for 3 minutes, then the rest of the water is added and mixing is continued for 5 to 6 minutes at medium speed. After mixing the specific weight of the batter is determined. Good baking results are often obtained if the specific weight is between 0.68 and 0.77.

The batter is then poured into two lined eight inch cake pans each containing 400 grams batter. The pans are baked at 176 degrees C. for 30 to 35 minutes.

The concentration of the emulsifier system in the cake mix depends upon the type of the cake mix. For white and yellow cake mixes of the formula of Table VII, concentration between 1.27 percent and 1.45 percent of the weight of the cake mix have been found best suited. For chocolate cakes, the best concentration in the given formula was around 1.25 percent. The influence of the concentration of the emulsifier system on white cake mixes and chocolate cake mixes is given in Table VII.

Should it be desired to add powdered fat to the cake mix, the fat should contain some dispersing agent like lactopalmitate or lacto-olein and the emulsifier syseetm should be added to the cake mix in an enveloped state as described in Example 2, since fat acts deleteriously on the activity of the emulsifier system, if stored in direct contact.

The baking results of white, yellow and chocolate cakes are tabulated in Table VIII. In these cakes, various amounts of oil were used and the amounts of water added in the first and second mixing step are tabulated. The composition of the ingredients with the exception of oil is given in Table VI.

TABLE VIII.—VARIATION OF OIL CONTENT IN CAKE BAKING

| Type Cake | (g.) Amt. Oil | (cc.) 1st Step Water | (cc.) 2nd Step Water | Specific Gravity | Vol., cc. | Comments |
|---|---|---|---|---|---|---|
| Sample: | | | | | | |
| 1 White | 0 | 100 | 260 | .54 | 1,325 | Fine grain. |
| 2 Do | 27 | 80 | 250 | .56 | 1,800 | Do. |
| 3 Do | 54 | 80 | 250 | .64 | 1,317 | Do. |
| 4 Do | 70 | 80 | 250 | .65 | 1,275 | Do. |
| 5 Do | 81 | 80 | 230 | .65 | 1,258 | Do. |
| 6 Do | 110 | 80 | 210 | .69 | 1,200 | Do. |
| 7 Yellow | 0 | 100 | 260 | .63 | 1,300 | Good grain. |
| 8 Do | 27 | 80 | 250 | .67 | 1,325 | Do. |
| 9 Do | 54 | 80 | 250 | .70 | 1,317 | Do. |
| 10 Do | 70 | 80 | 250 | .70 | 1,350 | Do. |
| 11 Do | 81 | 80 | 230 | .70 | 1,350 | Do. |
| 12 Do | 110 | 80 | 210 | .70 | 1,375 | Do. |
| 13 Chocolate | 0 | 90 | 240 | .63 | 1,358 | Do. |
| 14 Do | 27 | 90 | 240 | .65 | 1,450 | Do. |
| 15 Do | 54 | 90 | 240 | .70 | 1,492 | Do. |
| 16 Do | 70 | 90 | 240 | .70 | 1,500 | Do. |
| 17 Do | 81 | 90 | 220 | .70 | 1,492 | Do. |
| 18 Do | 110 | 90 | 200 | .70 | 1,558 | Do. |

The following cakes had the composition as in Table VI, but did not contain emulsifier:

| Type Cake | (g.) Amt. Oil | (cc.) 1st Step Water | (cc.) 2nd Step Water | Specific Gravity | Vol., cc. | Comments |
|---|---|---|---|---|---|---|
| 19 White | 54 | 80 | 250 | 1.00 | 950 | Open grain, poor. |
| 20 Yellow | 54 | 80 | 250 | .97 | 1,083 | Do. |
| 21 Chocolate | 54 | 90 | 240 | .95 | 1,208 | Do. |

From the foregoing, it will be seen that a new and novel emulsifier system has been provided which has unusual emulsifying power and whip imparting properties. The emulsifier system of the invention is very useful, particularly in the food field and in the cosmetic field. In addition, the emulsifier system makes possible new and unusual baked food products which can contain reduced amounts of fat or eliminate fat in such products. The emulsifier system can be readily dispersed and functions without activation. It is storable at elevated temperatures for extended periods of time.

Various features of the invention which are believed to be new are set forth in the following claims.

What is claimed is:

1. An emulsifier system comprising, in combination, a propyleneglycol monoester having a saturated fatty acid moiety derived from oils and fats and a stabilizer, said monoester having crystals being predominantly in the alpha crystalline form and said stabilizer being an ionic surface active salt which maintains said crystals in the alpha crystalline form, said system being substantially free of solvent for said monoester.

2. An emulsifier system comprising, in combination, a propyleneglycol monoester having a saturated fatty acid moiety derived from oils and fats and a stabilizer, said monoester being predominantly in the alpha crystalline form, said stabilizer being an ionic surface active salt and forming an interfacial complex in the system, said system being substantially free of solvent for said monoester.

3. An emulsifier system comprising, in combination, a propyleneglycol monoester having a saturated fatty acid moiety derived from oils and fats and a stabilizer, said monoester being essentially in the alpha crystalline form, said stabilizer being an ionic surface active salt and forming an interfacial complex in the system, said stabilizer having an HLB of at least 16, said system being substantially free of solvent for said monoester.

4. An emulsifier system comprising, in combination, 1,2 propyleneglycol monostearate and a stabilizer, said stearate being predominantly in the alpha crystalline form and said stabilizer being an ionic surface active salt, said system being substantially free of solvent for said monostearate.

5. An emulsifier system comprising, in combination, a propyleneglycol monoester having a saturated fatty acid moiety derived from oils and fats and a stabilizer, said monoester being essentially in the alpha crystalline form, said stabilizer being present at a level of between about 2 percent and about 15 percent and being an ionic surface active salt, said system being substantially free of solvent for said monoester.

6. An emulsifier system comprising, in combination, a propyleneglycol monoester having a saturated fatty acid moiety derived from fats and oils and a stabilizer, said monoester being essentially in the alpha crystalline form, said stabilizer being an ionic surface active salt and forming an interfacial complex in the system, said stabilizer being present at a level of at least 2 percent of the monoester and at a level below that which the crystalline phase of the stabilizer is not determinable by X-ray diffraction analysis, said system being substantially free of solvent for said monoester.

7. A food product containing the emulsifier system set forth in claim 6, said food product selected from the class consisting of cake mix, dough, and bread doughs.

8. An emulsifier system comprising, in combination, a propyleneglycol monoester having a saturated fatty acid moiety derived from fats and oils and a stabilizer, said monoester being essentially in the alpha crystalline form, said stabilizer being selected from the group consisting of non-toxic alkali or alkaline earth salts of (a) mono-, di-, or tri-carboxylic acids which contains, adjacent to the carboxylic group, one carbon atom, or an aliphatic chain of not more than 5 carbon atoms, one of which is connected by one or more ester or amide linkages with an alkyl group derived from a fatty acid having an even carbon chain of 12–22 carbon atoms; and (b) half esters of dibasic acids and higher fatty alcohols having an even carbon chain length of 12–18 carbon atoms, said stabilizer having an HLB of at least 16 and forming an interfacial complex in the system, said system being substantially free of solvent for said monoester.

9. An emulsifier system comprising, in combination, a propyleneglycol monoester and a glycerol monoester, each monoester having a saturated fatty acid moiety derived from oils and fats, and a stabilizer, said monoesters being essentially in the alpha crystalline form, said stabilizer being present at a level of between about 2 percent and at a level below which the crystalline phase of the stabilizer is not determinable by X-ray diffraction analysis, said system being substantially free of solvent for said monoesters, said level of stabilizer being based upon monoesters and being an ionic surface active salt.

10. A food product including the emulsifier system of claim 9, said food product being selected from the class consisting of cake mix, dough and bread dough.

11. An emulsifier system comprising, in combination, a propyleneglycol monoester and a glycerol monoester each having a saturated fatty acid moiety derived from oils and fats, and a stabilizer, said monoesters being essentially in the alpha crystalline form, said stabilizer being an ionic surface active salt and forming an interfacial complex in the system, said stabilizer being present at a level of between about 2 percent and about 15 percent.

12. An emulsifier system in accord with claim 11 in which said glycerol monoester is glycerol monostearate.

13. An emulsifier system in accord with claim 11 in which said propyleneglycol monoester is 1,2 propyleneglycol monostearate and said glycerol monoester is glycerol monostearate.

14. An emulsifier system in accord with claim 11 in which said propyleneglycol monoester is 1,2 propyleneglycol monosterate and said stabilizer is the sodium salt of stearyl-2-lactic acid.

15. An emulsifier system comprising, in combination, a 1,2 propyleneglycol monoester having a saturated fatty acid moiety derived from oils and fats and a stabilizer, said monoester being essentially in the alpha crystalline form, said stabilizer being selected from the group consisting of non-toxic alkali and alkaline earth salts of (a) mono-, di-, or tri-carboxylic acids which contain, adjacent to the carboxylic group, one carbon atom, or aliphatic carbon chain of not more than 5 carbon atoms, one of which is connected by one or more ester or amide linkages with an acyl group derived from a fatty acid, having an even carbon chain of 12–22 carbon atoms, and (b) half esters of dibasic acids and higher fatty alcohols having an even carbon chain of 12–18 carbon atoms, said stabilizer having an HLB of at least 16 and forming an interfacial complex in the system, said emulsifier system being substantially free from solvent compounds for said monoesters.

16. A cake mix comprising an emulsifier system including, in combination, a propyleneglycol monoester having a saturated fatty acid moiety derived from oils and fats and an ionic surface active salt stabilizer, said monoester being essentially in the alpha crystalline form.

17. A dough for baked goods comprising an emulsifier system including, in combination, a 1,2 propyleneglycol monoester having a saturated fatty acid moiety derived from oils and fats and an ionic surface active salt stabilizer, said monoester being essentially in an alpha crystalline form.

18. A bread dough comprising, in combination, a propyleneglycol monoester having a saturated fatty acid moiety derived from oils and fats and an ionic surface active salt stabilizer, said monoester being essentially in the alpha crystalline form.

References Cited

UNITED STATES PATENTS

| | | | |
|---|---|---|---|
| 2,744,825 | 5/1956 | Thompson et al. | 99—91 |
| 2,744,826 | 5/1956 | Thompson et al. | 99—91 X |
| 3,033,686 | 5/1962 | Landfried et al. | 99—91 |
| 3,034,897 | 5/1962 | Kuhrt et al. | 99—91 |
| 3,034,898 | 5/1962 | Kuhrt et al. | 99—91 |
| 3,180,736 | 4/1965 | Landfried | 99—91 |
| 3,268,338 | 8/1966 | Strobel | 99—118 X |

LIONEL M. SHAPIRO, *Primary Examiner.*

U.S. Cl. X.R.

99—91, 92, 118; 252—354